United States Patent [19]
Plant

[11] 4,005,354
[45] Jan. 25, 1977

[54] ELECTROMAGNETIC POSITION TRANSDUCERS

[75] Inventor: Anthony Brian Plant, Birmingham, England

[73] Assignee: Lucas Industries Limited, Birmingham, England

[22] Filed: May 7, 1975

[21] Appl. No.: 575,178

[30] Foreign Application Priority Data

May 11, 1974 United Kingdom ............ 20941/74

[52] U.S. Cl. .................................. 323/51; 340/196
[51] Int. Cl.² ......................................... G01L 9/10
[58] Field of Search .......... 323/6, 48, 51; 340/196, 340/199

[56] References Cited

UNITED STATES PATENTS 3,109,145  10/1963  Morris et al. ................. 340/196 X Primary Examiner—A. D. Pellinen

[57] ABSTRACT

A position transducer with a variable transformer and a feedback transformer to which an a.c. signal is applied via a variable gain amplifier controlled by the integrated output of a phase-sensitive rectifier. The secondary of the feedback transformer is connected in series with the primary of a coupling transformer coupling the variable transformer to the rectifier and with the secondary of the variable transformer so that in equilibrium there is a null voltage across the primary of this coupling transformer.

3 Claims, 1 Drawing Figure

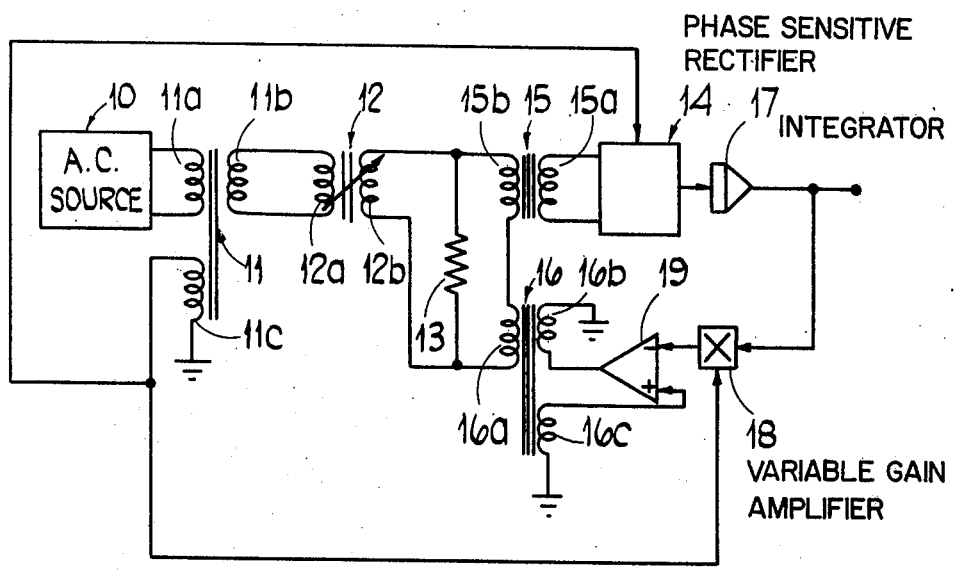

ELECTROMAGNETIC POSITION TRANSDUCERS

This invention relates to electromagnetic position transducers of the kind comprising an a.c. source, a variable transformer the coupling of the windings of which is varied in use by movement of a position input element and a phase sensitive rectifier circuit for producing a d.c. output determined by the position of said position input element. It is to be appreciated that such a position transducer may form a part of a pressure or force transducer.

With such transducers it has perviously been proposed to use additional transformers to couple the a.c. source to the variable transformers and to couple the variable transformer to the phase-sensitive rectifier to provide isolation and common mode rejection capabilities. The design of the transformer coupling the variable transformer to the phase-sensitive rectifier is critical and a transformer with low losses and a sufficiently high input impedance tends to be very bulky.

It is accordingly an object of the invention to provide a transducer of the kind specified in which isolation and common mode rejection are achieved without use of excessively bulky coupling transformers.

In accordance with the invention, a transducer of the kind specified includes an input coupling transformer coupling the a.c. source to the variable transformer, an output coupling transformer with its secondary winding connected to the phase-sensitive rectifier, a feedback transformer having its secondary winding connected in a closed series circuit with the primary winding of the output coupling transformer and the output winding of the variable transformer, an integrator connected to the output terminal of the phase-sensitive rectifier and a variable gain amplifier driving the primary winding of the feedback transformer, the amplifier producing an a.c. signal derived from said a.c. source and of magnitude dependent on the output of the integrator, whereby in equilibrium there is substantially no voltage across the primary winding of the output coupling transformer.

An example of the invention is shown diagrammatically in the accompanying drawing.

The transducer shown includes an a.c. source 10. An input coupling transformer 11 has its primary winding 11a driven by the source 10 and has two secondary windings 11b, 11c. The winding 11b is connected to an input winding 12a of a variable transformer 12. The transformer 12 has its core movable by a position input member (not shown) to vary the coupling between the input winding 12a and the output winding 12b. A load resistor 13 is connected across the winding 12b.

A phase-sensitive rectifier circuit 14 of known form is connected to the secondary winding 15a of an output coupling transformer 15. The primary winding 15b of this transformer 15 is connected in a closed series circuit with the winding 12b and with a secondary winding 16a of a feedback transformer 16. The transformer 16 has a primary winding 16b and an auxiliary secondary winding 16c.

The output terminal of the phase-sensitive rectifier 14 is connected to the input terminal of an integrator 17, the output terminal of which provides the output signal of the transducer. The output terminal of the integrator 17 is also connected to the control terminal of a variable gain amplifier 18 which is connected to the winding 11c of the input coupling transformer. A difference amplifier 19 has one input terminal connected to the output terminal of the amplifier 18 and its other input terminal connected to the winding 16c of the feedback transformer 16. The amplifier 19 drives the primary winding 16b of the transformer 16.

In use the integrator 17 integrates the output of the phase-sensitive rectifier and, in equilibrium produces a signal such that there is induced in the winding 16a an a.c. signal of equal magnitude to that induced in the winding 12b and 180° out of phase therewith. As a result there is no voltage across the winding 15b and no d.c. signal is produced by the phase-sensitive rectifier 14. Should there be a change in the position of the core of transformer 12 this will cause a small voltage to appear across the winding 15b so that a corresponding positive or negative d.c. signal will appear at the output terminal of the phase-sensitive rectifier. As a result the output of the integrator will be increased or decreased until equilibrium is restored.

The arrangement of the difference amplifier 19 is such that a compact lightweight inexpensive transformer 16 can be used, since it is driven from a low impedance source and the use of the winding 16c ensures that the effects of transformer losses therein are minimised. The output coupling transformer can also be small and light in weight since it only handles error signals rather than the full output voltage of the winding 12b.

It will also be appreciated that, since the transformer 12 and the amplifier 18 are fed from the same source, the circuit will not be sensitive to variations in the amplitude of the a.c. signal produced.

In order to detect failure of the transducer, e.g. a short circuit or open circuit condition in the winding 12b, the integrator may include a bias circuit to bias its input terminal. In normal operation this will mean that there will be a small voltage across the winding 15b in equilibrium. In the event of a failure such as those mentioned the output of the phase-sensitive rectifier will be zero and the bias will cause the integrator to ramp to a level outside the normal operating range. A suitable detecting circuit is used to detect this.

I claim:

1. An electromagnetic position tranducer of the kind comprising an a.c. source, a variable transformer the coupling of the windings of which is varied in use by movement of a position input element and a phase sensitive detector for producing a d.c. output determined by the position of said position input element, the transducer including an input coupling transformer coupling the a.c. source to the variable transformer, an output coupling transformer with its secondary winding connected to the phase-sensitive rectifier, a feedback transformer having its secondary winding connected in a closed series circuit with the primary winding of the output coupling transformer and the output winding of the variable transformer, an integrator connected to the output terminal of the phase-sensitive rectifier and a variable gain amplifier driving the primary winding of the feedback transformer, the amplifier producing an a.c. signal derived from said a.c. source and of magnitude dependent on the output of the integrator, whereby in equilibrium there is substantially no voltage across the primary winding of the output coupling transformer.

2. A transducer as claimed in claim 1 in which the variable gain amplifier has an input terminal connected to an additional secondary winding on the input coupling transformer.

3. A transducer as claimed in claim 1 further comprising a difference amplifier having one input terminal connected to the output of the variable gain amplifier, another input terminal connected to an auxiliary secondary winding on the feedback transformer and an output terminal connected to the primary winding of the feedback transformer.

* * * * *